(12) United States Patent
Uhm

(10) Patent No.: US 6,354,113 B2
(45) Date of Patent: *Mar. 12, 2002

(54) FIBER OPTIC DRAW FURNACE FEATURING A FIBER OPTIC PREFORM HEATING AND FIBER DRAWING PROGRAMMABLE LOGIC CONTROLLER

(75) Inventor: Daniel D. Uhm, Cornelius, NC (US)

(73) Assignee: Alcatel, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,816

(22) Filed: Jan. 20, 1999

(51) Int. Cl.[7] ............................................. C03B 37/029

(52) U.S. Cl. ........................................... 65/484; 65/486

(58) Field of Search ..................... 65/484, 486, 488, 65/381, 491, 382

(56) References Cited

U.S. PATENT DOCUMENTS

| 3,582,305 A | 6/1971 | Dunlap et al. |
| 4,174,842 A | 11/1979 | Partus |
| 4,277,270 A | 7/1981 | Krohn |
| 4,277,271 A | 7/1981 | Krohn |
| 4,309,201 A | 1/1982 | Klop et al. |

(List continued on next page.)

FOREIGN PATENT DOCUMENTS

| GB | 1523595 | 10/1974 |
| JP | 60-186431 | 9/1985 |
| JP | 4-325427 | 11/1992 |
| JP | 4-325428 | 11/1992 |
| JP | 5-139771 | 6/1993 |

OTHER PUBLICATIONS

"Patent Abstract of Japan," Application No. 3–122094, K. Watanabe et al., "Production of Optical Fiber Preform", Nov. 13, 1992.
"Patent Abstract of Japan," Application No. 3–122095, K. Watanabe et al., "Production of Optical Fiber Preform", Nov. 13, 1992.
"Patent Abstract of Japan," Application No. 3–334063, N. Hagino et al., "Method for Controlling Optical Fiber Drawing Furnace," Jun. 8, 1993.
"Patent Abstract of Japan", Furukawa Electric Co., "Optical fibre preform drawing appts.—includes tension measuring meter and burner fuel regulator," JP–037330, Mar. 1, 1984.
Motohiro Nakahara et al., "Drawing Techniques for Optical Fibers," Review of the Electrical Communication Laboratories, Vo. 26, Nos. 3–4, Mar.–Apr. 1978.
David H. Smithgall et al., "Drawing Lightguide Fiber," Western Electric Eng. (USA), vol. 24, No. 1., Winter 1980.

Primary Examiner—John Hoffmann
(74) Attorney, Agent, or Firm—Ware, Fressola, Van Der Sluys & Adolphson LLP

(57) ABSTRACT

The present invention provides a fiber optic draw furnace having a fiber optic heating and draw control system that controls the heating of a fiber optic preform which is partially melted by a furnace and the drawing of an optical fiber from the fiber optic preform by a fiber drawing device. The fiber optic heating and draw control system features a fiber optic heating and drawing device controller that responds to a furnace power consumption control signal from a fiber optic preform heating device in the furnace, for providing a furnace heating control signal to the fiber optic preform heating device in the furnace and a fiber tension draw control signal to the fiber drawing device to maintain a desired fiber draw tension on the optical fiber. In one embodiment, the fiber optic heating and drawing device controller is a programmable logic controller. One advantage of the present invention is that it eliminates the need for an optical pyrometer port, which results in a symmetrical temperature profile around the circumference of the preform and also helps eliminate induced stresses that can cause defects in an optical fiber.

7 Claims, 1 Drawing Sheet

U.S. PATENT DOCUMENTS

| | | |
|---|---|---|
| 4,317,666 A | 3/1982 | Faure et al. |
| 4,373,943 A | 2/1983 | Gouronnec et al. |
| 4,400,190 A | 8/1983 | Briere |
| 4,407,666 A | 10/1983 | Briere |
| 4,450,333 A | 5/1984 | Andrejco et al. |
| 4,657,572 A * | 4/1987 | Desai .......................... 65/488 |
| 4,673,427 A | 6/1987 | Van Der Giessen et al. |
| 4,793,840 A * | 12/1988 | Harding ....................... 65/382 |
| 4,911,742 A | 3/1990 | Newbould et al. |
| 4,950,319 A | 8/1990 | Lane et al. |
| 4,988,374 A | 1/1991 | Harding et al. |
| 5,017,209 A | 5/1991 | Yoshimura |
| 5,076,824 A | 12/1991 | Miller |
| 5,079,433 A * | 1/1992 | Smith .......................... 65/382 |
| 5,228,893 A | 7/1993 | Smithgall et al. |
| 5,259,856 A | 11/1993 | Ohga et al. |
| 5,314,517 A * | 5/1994 | Koening ....................... 65/382 |
| 5,316,562 A | 5/1994 | Smithgall et al. |
| 5,320,658 A | 6/1994 | Ohga et al. |
| 5,350,433 A | 9/1994 | Baniel |
| 5,449,393 A * | 9/1995 | Tsuneishi ..................... 65/382 |
| 5,545,246 A | 8/1996 | Lysson et al. |
| 5,551,967 A * | 9/1996 | Urruti ......................... 65/382 |
| 5,944,865 A * | 8/1999 | Do ............................. 65/382 |

* cited by examiner

FIBER OPTIC DRAW FURNACE FEATURING A FIBER OPTIC PREFORM HEATING AND FIBER DRAWING PROGRAMMABLE LOGIC CONTROLLER

BACKGROUND OF THE INVENTION

1. Field of the Invention

The present invention relates to a fiber optical fiber draw furnace for drawing optical fiber from a preform.

2. Description of Related Art

Known fiber optic draw furnaces control the draw of the optical fiber from the preform by monitoring various parameters, including among others fiber tension, fiber diameter, fiber velocity and furnace temperature. For example, see U.S. Pat. Nos. 5,0 79,433; 5,228,893 and 5,316,562.

Existing graphite resistance fiber optic draw furnace control methods utilize temperature feedback based on optical measurement using a pyrometer to control furnace temperature. The pyrometer requires a sight "port" that is essentially a cylindrical hole through the insulation material.

The use of the sight port results in several disadvantages including among other things uneven heating of the preform (temperature profile not uniform due to heat sink created by pyrometer port), accelerated graphite erosion (heating element, furnace insulation, etc.), and improper alignment and calibration of the pyrometer for proper furnace control feedback. Induced stresses created by a non-uniform thermal profile can result in optical and physical defects in the drawn fiber such as elevated attenuation loss, fiber curl, etc.

Another disadvantage of using a site port is that it will darken over time due to the frequent condensation of material on the transparent wall which blocks the light flux to be measured, as described in U.S. Pat. No. 4,317,666, column 1, lines 36–43.

Yet another disadvantage is that induced stresses are created by the non-uniform thermal profile of the preform which result in optical and physical defects in the drawn fiber such as elevated attenuation loss and fiber curl.

SUMMARY OF THE INVENTION

The present invention provides a fiber optic draw furnace having a fiber optic heating and draw control system that controls the heating of a fiber optic preform which is partially melted by a furnace and the drawing of an optical fiber from the fiber optic preform by a fiber drawing device.

The fiber optic heating and draw control system features a fiber optic heating and drawing device controller that responds to a furnace power consumption control signal from a fiber optic preform heating device in the furnace, for providing a furnace heating control signal to the fiber optic preform heating device in the furnace and a fiber tension draw control signal to the fiber drawing device to maintain a desired fiber draw tension on the optical fiber.

In one embodiment, the fiber optic heating and drawing device controller is a programmable logic controller.

The fiber optic preform heating feedback signal from the fiber optic preform heating device is a furnace power consumption feedback signal that feeds information about the power consumption of the furnace back to the fiber optic preform heating and fiber drawing controller.

The furnace power consumption feedback signal includes information about a sensed measurement of voltage and amperage of electrical energy used to heat the furnace.

One advantage of the present invention is that it eliminates the need for an optical pyrometer port, which results in a symmetrical temperature profile around the circumference of the preform and also helps eliminate induced stresses that can cause defects in an optical fiber.

Another advantage is that the overal furnace life is increased, reducing operating costs, because graphite erosion is reduced. Reducing graphite erosion results in a cleaner furnace (dramatically reduces graphite dust and particulate generation) and increased furnace stability and longevity. This results in a cleaner furnace having significantly less graphite dust and particulate generation while increasing furnace stability and longevity. A clean furnace is essential for the manufacturing of high strength optical fiber.

The present invention may be more clearly understood from the following description of a specific and preferred embodiment read in conjunction with the accompanying detailed drawing.

DETAILED DESCRIPTION OF THE BEST MODE OF THE INVENTION

Figure 1:
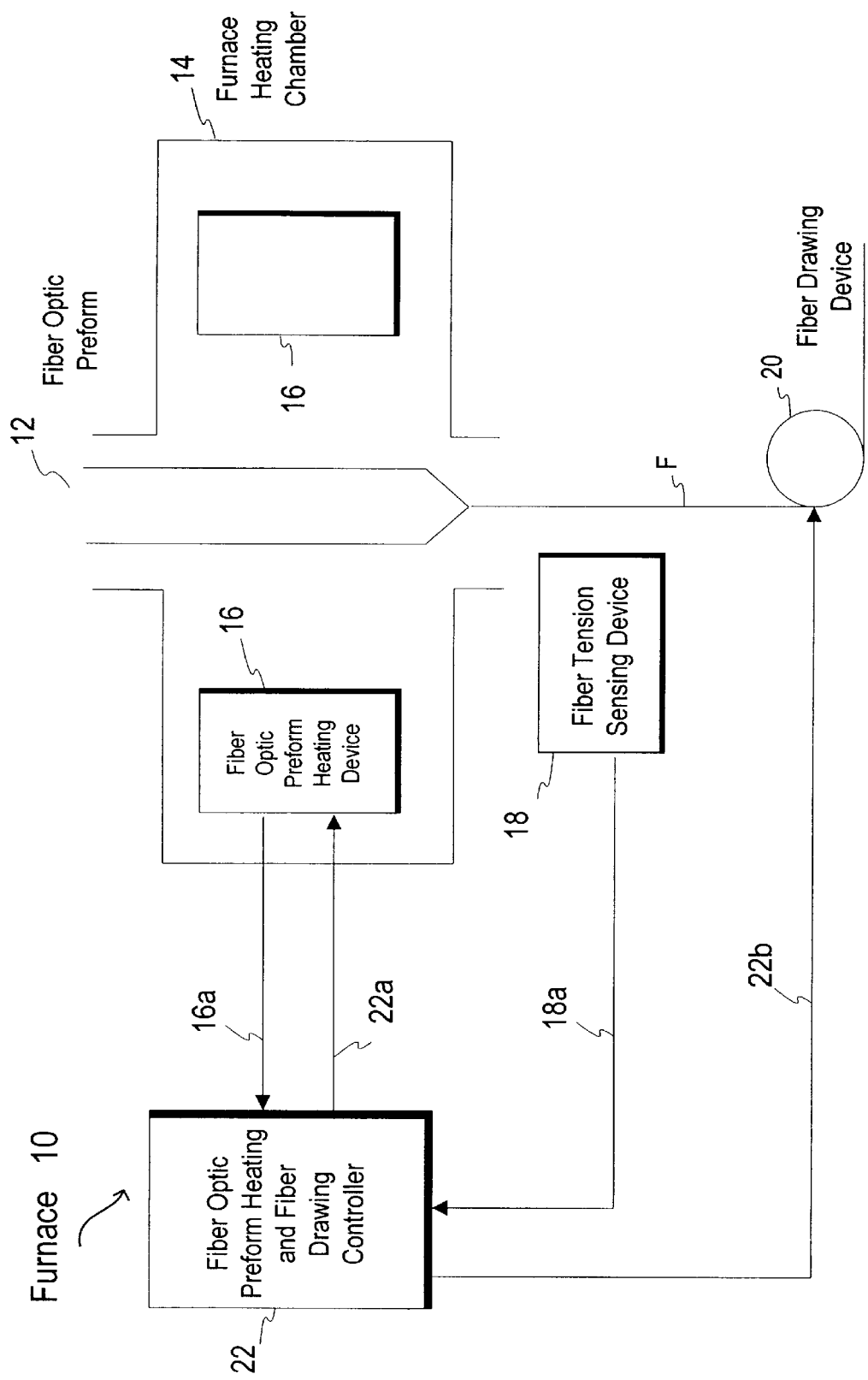
FIG. 1 is a schematic view of a fiber optic draw furnace that is the subject matter of the resent invention.

FIG. 1 shows a fiber optic draw furnace generally indicated as 10 for drawing an optical fiber F from a molten preform 12. The fiber optic draw furnace 10 includes a furnace heating chamber 14, a fiber optic preform heating device 16, a fiber tension sensing means 18, a fiber drawing means 20, and a fiber optic preform heating and fiber drawing controller means 22. In one embodiment, the fiber optic draw furnace 10 may be an optical graphite furnace, although the scope of the invention is not intended to be limited to any particular type of furnace.

The furnace heating chamber 14 houses the fiber optic preform heating device 16, which continuously heats and partially melts the molten preform 12. The fiber drawing means 20 draws the optical fiber F from the molten preform 12 as a melting glass.

In operation, the fiber optic preform heating means 16 responds to a fiber optic preform heating control signal along line 22a from the fiber optic preform heating and fiber drawing controller means 22, for heating the molten preform 12, and provides a fiber optic preform heating feedback signal along line 16a back to the fiber optic preform heating and fiber drawing controller means 22. The preform heating device 16 is known in the art, and the scope of the invention is not intended to be limited to any particular type thereof. The preform heating device 16 may be of the graphite resistance type, although other forms of heating devices are clearly intended to be within the scope of the present invention.

As fiber optic preform 12 begins melting, the optical fiber F is formed. The optical fiber F passes a fiber tension sensing means 18, which senses a fiber tension. The fiber tension sensing means 18 responds to a tension sensed in the optical fiber F, for providing a sensed fiber tension signal along line 18a to the fiber optic preform heating and fiber drawing controller means 22. The fiber tension sensing means 18 is known in the art, and may include a non-contact type. Embodiments are also envisioned in which the fiber tension sensing means 18 is a contact type, which are also known in the art, although the scope of the invention is not intended to be limited to any particular way of sensing fiber tension.

The fiber drawing means 20 responds to a fiber drawing control signal along line 22b from the fiber optic preform heating and fiber drawing controller means 22, for drawing the optical fiber F. The fiber drawing means 20 is known in the art, and the scope of the invention is not intended to be limited to any particular type thereof. The fiber drawing means 20 is also known in the art as a capstan. The drawing device 20 may sometimes be downstream of other devices, such as a fiber coating applicator (not shown), which are not a part of the present invention shown and described herein.

The fiber optic preform heating and fiber drawing controller means 22 responds to the fiber optic preform heating feedback signal along line 16a from the preform heating device 16, and further responds to the sensed fiber tension signal along line 18a from the fiber tension sensing means 18, for providing the fiber optic preform heating control signal along line 22a to the fiber optic preform heating means 16 to control the heating of the fiber optic preform 12, and also for providing the fib r drawing control signal along line 22b to the fiber drawing means 20 to control the drawing of the optical fiber (F). The fiber optic preform heating and drawing controller means 22 may be a programmable logic controller (PLC), or microprocessor based architecture for running a fiber optic preform heating and drawing controller program. In operation, the programmable logic controller 22 maintains desired draw tension by controlling the preform heating device 16 and the draw capstan 20. The scope of the invention is intended to cover embodiments using hardware, software or a combination thereof.

In operation, the fiber optic preform heating feedback signal along line 16a from the fiber optic preform heating means (16) is a furnace power consumption feedback signal that feeds information about the power consumption of the furnace (10) back to the fiber optic preform heating and fiber drawing controller means (22). The furnace power consumption feedback signal includes information about a sensed measurement of voltage and amperage of electrical energy used to heat the furnace (10).

In effect, the present invention uses power control instead of temperature control to predict the melting rate of the fiber optic preform 12. The power control relies on the principal of power feedback using a preform heating feedback signal 16a to control fiber optic draw tension. The power in the form of current and voltage consumed by the fiber optic preform heating element 16 is fed back to the programmable logic controller 22 in the process control loop. As a result, the fiber optic draw tension is controlled without the need for sensing the furnace temperature. The power control can also be accomplished by measuring consumption of any type of energy used to heat the fiber optic preform 12, whether it be electric or otherwise.

As those skilled in the art will recognize, the invention is not necessarily limited to the specific embodiments described herein, and the inventive concept may be implemented in additional ways, all in accordance with the claims below.

What is claimed is:

1. A furnace (10) for heating a fiber optic preform (12) inside a furnace heating chamber (14) and for drawing an optical fiber (F), comprising:

a fiber optic preform heating device (16), responsive to a fiber optic preform heating control signal, for heating the fiber optic preform (12), and for further providing a fiber optic preform heating feedback signal containing information about the furnace power consumption of the fiber optic preform heating device (16), the information about the furnace power consumption being indicative of any energy used to heat the furnace;

a fiber tension sensing device (18), responsive to a tension of the optical fiber (F), for providing a sensed fiber tension signal;

a fiber drawing device (20), responsive to a fiber drawing control signal, for drawing the optical fiber (F); and a fiber optic preform heating and fiber drawing controller (22), responsive to the fiber optic preform heating feedback signal, and further responsive to the sensed fiber tension signal, for providing the fiber optic preform heating control signal to the fiber optic preform heating device (16) to control the heating of the fiber optic preform (12), and for providing the fiber drawing control signal to the fiber drawing device (20) to control the drawing of the optical fiber (F), the fiber optic preform heating and fiber drawing controller (22) controlling fiber draw tension of the fiber optic preform (12) independent of any sensed temperature of the furnace (10), and also controlling the preform heating device (16) independent of any sensed furnace temperature.

2. A furnace (10) according to claim 1, wherein the fiber optic preform heating and fiber drawing controller (22) is a programmable logic controller.

3. A furnace (10) according to claim 1, wherein the fiber tension sensing device (18) is a non-contact fiber tension device that responds to the tension of the optical fiber (F), for providing a non-contact sensed fiber tension signal to the fiber optic preform heating and fiber drawing controller (22).

4. A furnace (10) according to claim 1, wherein the fiber optic preform heating feedback signal from the fiber optic preform heating device (16) is a furnace power consumption feedback signal that feeds information about the furnace power consumption of the furnace (10) back to the fiber optic preform heating and fiber drawing controller device (22).

5. A furnace (10) according to claim 4, wherein the furnace power consumption feedback signal includes information about a sensed measurement of voltage and amperage of electrical energy used to heat the furnace (10).

6. A furnace (10) for heating a fiber optic preform (12) inside a furnace heating chamber (14) and for drawing an optical fiber (F), having a fiber optic preform heating device (16) for heating the fiber optic preform (12), having a non-contact fiber tension sensing device (18) for providing a non-contact sensed fiber tension signal, and also having a fiber drawing device (20) for drawing the optical fiber (F), the furnace (10) comprising:

a fiber optic preform heating and fiber drawing programmable logic controller (22) that responds to a fiber optic preform heating furnace power consumption feedback signal from the fiber optic preform heating device (16), the fiber optic preform heating furnace power consumption feedback signal being indicative of any energy used to heat the furnace, and that further responds to a sensed fiber tension signal from the non-contact fiber tension sensing device (18), for providing a fiber optic preform heating control signal to the fiber optic preform heating device (16) to control the heating of the fiber optic preform (12), and for providing a fiber drawing control signal to the fiber drawing device (20) to control the drawing of the optical fiber (F), the fiber optic preform heating and fiber drawing controller (22) controlling the fiber draw tension of the fiber optic preform (12) without the furnace sensing a temperature of the furnace (10).

7. A furnace (10) according to claim 6, wherein the furnace power consumption feedback signal includes information about a sensed measurement of voltage and amperage of electrical energy used to heat the furnace (10).

* * * * *